March 14, 1939.  R. J. BURROWS ET AL  2,150,151
SELECTIVE DRIVE MECHANISM
Original Filed Jan. 11, 1936  3 Sheets-Sheet 3
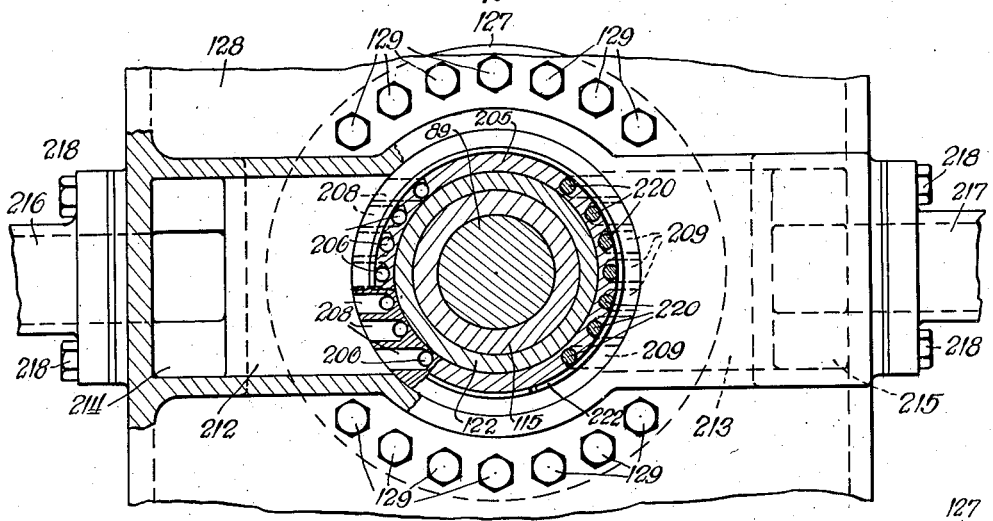
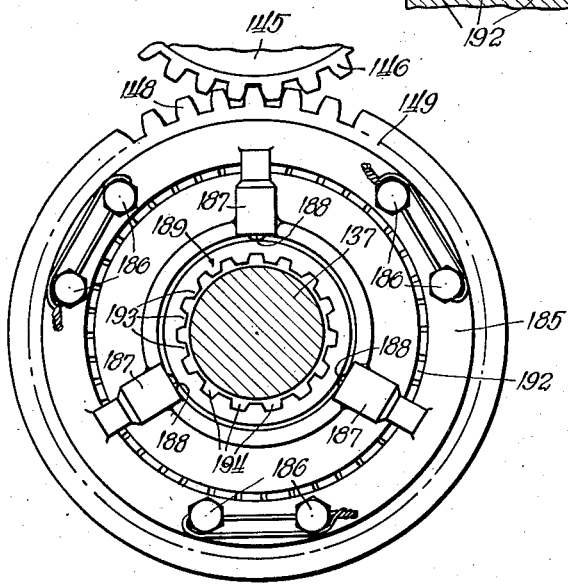
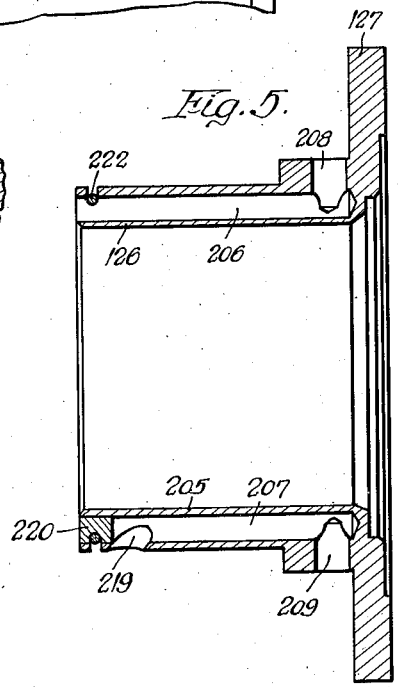
Inventors:
Robert J. Burrows,
Robert Lapsley,
Alfred O. Williams.
By Walter E. Schirmer
Atty.

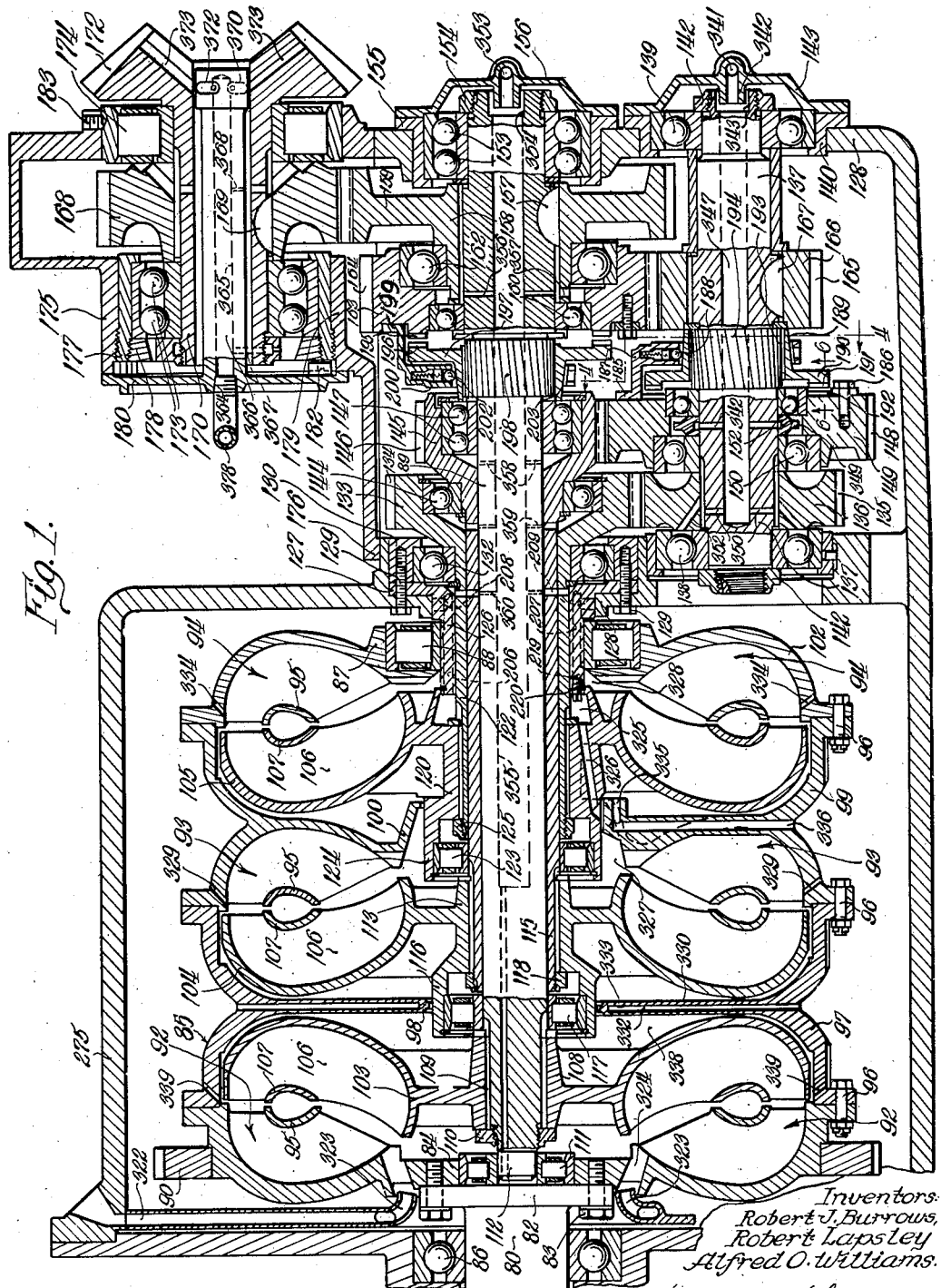

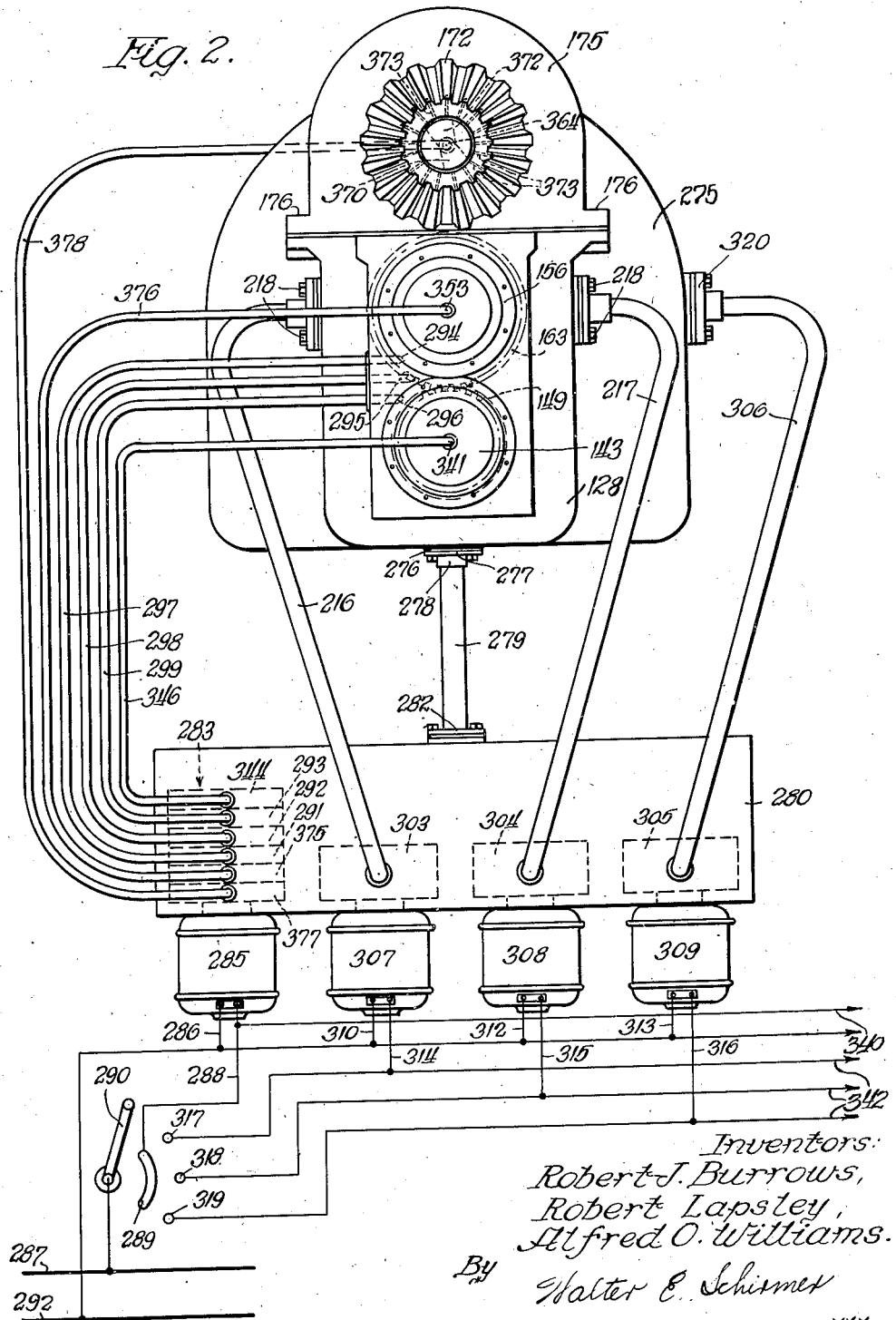

Patented Mar. 14, 1939

2,150,151

UNITED STATES PATENT OFFICE 2,150,151

SELECTIVE DRIVE MECHANISM

Robert J. Burrows, Battle Creek, Robert Lapsley, Berrien Springs, and Alfred O. Williams, Battle Creek, Mich., assignors to Clark Equipment Company, Buchanan, Mich., a corporation of Michigan Original application January 11, 1936, Serial No. 58,712. Divided and this application August 7, 1937, Serial No. 157,856

13 Claims. (Cl. 60—54)

This invention relates to selective drive mechanisms, and more particularly is directed to selective drive transmitting means for heavy road and rail vehicles such as trucks, busses, rail cars and the like.

The present application is a division of our co-pending application, Serial No. 58,712, filed January 11, 1936.

Recent developments in the design of trucks, busses and rail cars requiring relatively high speed operation with a considerable initial inertia load to be overcome in starting the vehicle have introduced numerous problems such as the type of change speed drive transmission to be employed, and the selective control of this transmission for various torque requirements.

It has been suggested, and some experimental development has been attempted in connection with high powered Diesel or semi-Diesel engines which are coupled with generators and electric driving motors, whereby the trucks, busses or rail cars derive their torque from their electrically driven motors. The resort to this construction has been due in a large measure to the inflexibility of operation of Diesel engines, and the inability to accommodate such engines to change speed gear transmissions or the like. In addition, in order to secure smooth starting with gradual pick-up of the relatively heavy load and inertia due to the weight of the vehicle, the ordinary type of change speed gear transmission found in automotive vehicles does not appear to be adequate, especially when the ordinary type of friction type of clutch is employed. We have also found that, while electrical transmissions have excellent operating characteristics and are reasonably reliable, the heavy weight and low efficiency of the power transmission considerably offsets any advantages obtained by their use. A mechanical drive has a much higher over-all efficiency than a combination of mechanical power units with electrical drive equipment.

Other disadvantages arising from prior types of combined drive mechanisms of this class with which we are familiar are the increased spacial requirements necessary for the conversion units and their control mechanism, and the increased number of separate rotating parts which must be serviced, inspected and repaired, as well as the cost of the equipment.

One of the primary objects of the present invention is to provide a selective drive mechanism comprising change speed gearing in which the gears for the various driving ratios remain constantly in mesh, and hydraulic clutches are employed for effecting shifting from one driving ratio to another. An important advantage secured by such a drive resides in the flexibility of operation, which may be obtained since no predetermined sequence of selection of the driving ratios is necessary, and such selection can be made from any one to any other ratio as determined by the operator.

Another object of the present invention is to provide a common control means for simultaneously effecting selection of the same driving ratio at a plurality of separately operating drive units, this control means being positioned at any convenient or desired location in the vehicle being driven, or even in a separate vehicle coupled to the driving vehicle, such as an articulated bus or train design.

In order to render the driving mechanism more flexible in operation, the present invention contemplates hydraulic clutches for selectively coupling the various sets of change speed gearing to the driving shaft, irrespective of the speed at which the driving shaft is rotating. Thus the engine units may be brought up to substantially full speed operation prior to the coupling of the driving gear mechanism thereto, and depending on the torque load and acceleration which is desired, any predetermined driving ratio may be selected and the load will be smoothly and gradually picked up automatically by the hydraulic clutches, thereby providing for smooth starting and acceleration of the vehicle at any desired rate.

Another feature of the present invention resides in a novel type of control mechanism for effecting synchronized selection of the various driving ratios at each of the drive units, which mechanism is adapted to be extended to any desired number of drive units, all of which may be simultaneously controlled from a single station or control point.

Another advantage secured by the present invention resides in the provision of a composite driving gear assembly with the hydraulic clutches for operating the same being disposed entirely at one side of the various sets of drive gears whereby the pressure lines for operating the hydraulic clutches are entirely clear and independent of any of the gear mechanisms. This results in a simplified and compact arrangement which may be easily assembled, and which is readily accessible for inspection and repair. This also eliminates the necessity of sliding clutches or the like in the transmission, whereby the axial length of the unit can be reduced and the usual shifter rods and actuating means therefor can be eliminated. Thus the selective transmission unit may be disposed at any desired portion of the vehicle, whereby the load distribution for the power unit and transmission can be adequately balanced in the vehicle body without regard to the necessity for torque mechanism connection thereto from the operator's station. The remote control of this mechanism is of course effected through fluid pressure lines, which may be actuated electrically or in any other suitable manner.

We also provide for adapting a single selective drive mechanism to any desired drive ratio by employing a set of interchangeable driving gears interposed between the driven shaft of the selective drive mechanism and the drive transmitting shaft leading to the axle.

We also provide for adapting a single drive mechanism to any desired drive ratio by employing a set of interchangeable driving gears interposed between the output shaft of the selective drive mechanism, and the drive transmitting means leading to the axle or other traction member.

Another advantage secured by the present invention is the provision of a mechanism for taking care of the change speed requirements at torque multiplications essential in such vehicle designs so that the clutching takes place noiselessly and efficiently, providing a transmission means from the prime mover to the axle that embodies all the advantageous operating characteristics and reliability of an electric drive without the attendant disadvantages of complicated control mechanism, low efficiency and heavy weight.

Another feature of the present invention resides in the provision of means for securing lubrication of the gears and bearings in the selective transmission unit, which is also under the control of an operator and is simultaneously actuated to provide a forced lubricant feed whenever the unit is in operation.

Other objects and advantages of the present invention will appear more fully from the detailed description which, taken in conjunction with accompanying drawings, will disclose to those skilled in the art the particular construction and operation of a preferred form of the present invention.

In the drawings:

Figure 1 is a detailed sectional view through a preferred form of selective drive mechanism as embodied in the present invention;

Figure 2 is an end elevational view of the mechanism shown in Figure 1, together with a diagrammatic circuit embodying the controlling means therefor;

Figure 3 is a sectional view taken substantially of line 3—3 of Figure 1;

Figure 4 is a sectional view through one of the overrunning clutch mechanisms embodied in the present invention taken substantially on line 4—4 og Figure 1;

Figure 5 is a vertical sectional view through the hydraulic coupling member for introducing the fluid under pressure into the hydraulic clutches; and Figure 6 is a sectional view taken on line 6—6 of Figure 1.

Considering now in detail the three-speed hydraulic transmission shown in Figure 1, the driven shaft of a power unit is indicated at 80 and is provided with a flange 82 suitably secured by means of the bolts 83 to the end flange 84 of the enclosing rotatable casing indicated generally at 85 of the hydraulic coupling unit, which unit is supported at the end adjacent the engine unit by means of bearings 86, and at its opposite end is provided with a cylindrical recessed portion 87 adapted to have engagement with bearings 88, the casing 85 thereby being rotatably mounted to have conjoint rotation with the shaft 89 within the transmission housing and engine housing.

The front portion or end toward the power unit of the casing 85 is provided with a ring gear 90 having radially extending teeth adapted to be engaged by any suitable starting mechanism for initially starting the engine through the rotation of the shaft 89. The hydraulic coupling casing 85 is provided with three rigid driving portions, indicated at 92, 93 and 94, each of which comprises a plurality of radially extending ribs or vanes formed integral with the various portions of the casing and forming centrifugal pump impellers, and having at their free edges core ring portions 95 extending annularly in integral engagement with each of the ribs of the driving elements 92, 93 and 94.

The casing 85 is made up of a plurality of component parts having radially extending flanges which are bolted together as indicated at 96, whereby the driving elements 92, 93 and 94 rotate as a unit upon rotation of the shaft 80. One of the intermediate elements 97 is provided with an inwardly extending radial flanged portion 98 which separates two of the hydraulic clutches, while a second intermediate element 99 is also provided with a radially and angularly extending portion 100 separating the driving element 93 from the driving element 94. The end element 102 carries the ribs of the third driving element 94, and is mounted for rotation on the bearings 88.

Cooperating with each of the driving elements 92, 93 and 94 is a corresponding driven element comprising turbine members 103, 104 and 105. Each of the members 103, 104 and 105 is provided with radially extending vanes or ribs 106, corresponding to the vanes of the driving elements, and having an annular semi-cylindrical core ring member 107 disposed therein joining all of the ribs or vanes of each of these members and cooperating with the ring portion 95 of the driving element to provide a substantially closed annular core ring between the respective sets of ribs. The member 103 is provided with a hub portion 108 which is splined or otherwise non-rotatably secured to the splined end 109 of the shaft 89. A suitable stop nut 110 is threaded onto the reduced portion of the shaft 89 into engagement with the end face of the hub section 108 to prevent outward displacement of the member 103 with respect to the shaft 89. The extending reduced portion 112 of the shaft 89 is piloted in the bearings 111 carried by plate 84, whereby it is mounted concentrically with the drive shaft 89.

The member 104 is provided with a hub portion 113, splined at 114 to a tubular sleeve member 115 loosely rotatable on the shaft 89. The member 113 is also provided with a cylindrical flange portion 116 whereby it is rotatably supported with respect to the shaft 89 by means of the bearings 117 engaging the shaft between the sleeve 115 and the hub portion 108 of the member 103. A suitable lock nut 118 engages the end face of the hub portion 113 of the member 104 to prevent its displacement from the splined section of the tubular sleeve member 115.

The member 105 is provided with a hub portion 120 which is splined or otherwise non-rotatably secured to a sleeve member 122 freely rotatable upon the sleeve member 115. The member 105 is mounted for rotation with respect to the exterior surface of the sleeve member 115 by means of the roller bearings 123 carried between the extending cylindrical flange 124 formed integral with the hub portion of the member 105 and the outer surface of the sleeve 115 intermediate the hub portions 113 and 120. A suitable lock nut 125 is threaded onto the end of the sleeve member 122 to prevent displacement of the hub portion 120 of the member 104 outwardly thereof.

It will be noted that the remote side of the hydraulic clutch casing 85 is supported on the bearings 88 which, about their inner bearing race, are supported upon the external surface of a cylindrical flange member 126 shown in more detail in Figures 3 and 5. The member 126 is provided with a radially extending flange 127 whereby the same may be bolted to a gear case housing 128 which houses the change speed gears employed in connection with the present transmission. The bolts for securing the member 126 to the housing and in position about the external periphery of the sleeve 122 are indicated at 129, and also serve to secure a retaining ring 130 in position for supporting the outer race of a ball bearing member 132 interposed between the external surface of the tubular sleeve 122 and the retaining ring 130.

The end of the sleeve member 122 is provided with a radially extending portion 133 forming a ring gear having teeth 134, which teeth are adapted to mesh with the teeth 135 of a ring gear member 136 keyed or otherwise suitably secured to a countershaft 137 supported in suitable bearings 138 within the gear case housing 128. The opposite end of the shaft 137 is piloted in suitable bearings 139 carried in the retaining ring 140 which is piloted in the end of the housing 128, the ends of the countershaft 137 being provided with lock nuts 142 threaded thereon, the end of the shaft supported by the bearings 139 being suitably closed by means of the closure plate 143.

Suitable ball-bearing means 144 is interposed between the gear portion 133 of the tubular sleeve 122 and the external periphery of the sleeve 115, whereby the two sleevss are mounted for relative rotation with respect to each other. The sleeve 115 is provided with a radially extending portion 145, having the radially extending gear teeth 146 formed thereon, and supported on suitable double ball-bearing means 147 for free rotation about the shaft 89.

The teeth of the gear portion 145 of the sleeve 115 are adapted to have engagement with the teeth 148 of a gear member 149 which is mounted for free rotation about the countershaft 137 by means of the bearings 150 and 152.

The shaft 89, extending through the hydraulic clutch unit and through the gear housing 128, is piloted at its opposite end in the double ball-bearing means 153, being provided with a suitable lock nut 154, the bearings 153 being retained in position by the ring 155 piloted in the end of the housing 128, the end of the shaft being enclosed by the cover plate member 156.

The shaft 89 is also provided with an intermediate splined portion 157 which is engaged by the splined hub 158 of a gear member 159 having rotation between the bearings 153 and a double set of bearings 160 and 162 which rotatably support a gear member 163, having gear teeth 164, for free rotation about the shaft 89. The teeth 164 of the gear member 163 are adapted to mesh with the teeth 165 of a gear member 166 which is splined at 167 to the countershaft 137, whereby rotation of the countershaft produces corresponding rotation of the gear 163.

The teeth of the gear 159 are adapted to have driving engagement with the teeth of a gear member 168 splined at 169 to the tubular shaft portion 170 of a bevel gear member 172, the shaft portion 170 of the gear member 172 being suitably supported in bearings 173 and 174 carried by the housing 175 which is bolted or otherwise secured to the upper surface of the housing 128, as indicated at 176. While we show a bevel gear 172 for transmitting torque from the selective drive unit to the driven axle, it is obvious that in place of the gear 172 a shaft may be provided having means for coupling a torque transmitting member thereto such as a propeller shaft or the like, if the power unit is disposed in a manner such as to require such connection. Also, the housing 175 may be disposed in any angular position with respect to the shaft 89, and may be placed to the side of this shaft, as well as above the shaft. This housing 175 may be termed an adapter housing, since it is within the scope of the present invention to provide for any desired driving ratio by changing the gears 159 and 168, whereby the transmission may be employed to produce various driving ratios between engine shaft 80 and the bevel gear 172 independently of the individual gear ratios of the various speeds of the transmission. The bearings 173 are held in position by a pair of concentric retaining rings 177 and 178 threaded into a cylindrical boss portion 179 of the housing 175, the boss portion being provided with a closure plate 180 having a lug member 182 for preventing relative rotation between the retaining rings 177 and 178 and the boss portion 179. A suitable set screw 183 is provided for retaining the outer race of the bearing 174 in position.

As has been pointed out, the gear member 149 is freely rotatable with respect to the countershaft 137. In order to provide for effective rotation of the countershaft 137 upon predetermined rotation of the gear 149, we provide an overrunning clutch mechanism, shown more in detail in Figure 4, comprising a ring element 185 which is bolted to the side face of the gear 149 by means of a plurality of bolts 186 which may be suitably secured together to prevent relative rotation. The ring member 185 is provided with spaced offset inwardly extending portions 187 containing suitable spring-pressed ball means 188 having riding frictional engagement on the slightly tapered surface 189 of a clutching member 190. The clutching member 190 is provided, at its inner portion, with a radially extending flange having axially projecting teeth 191 formed in the side face thereof, the teeth 191 being of ratchet formation to engage with suitable ratchet teeth 192 formed in the side face of the gear 149 radially inwardly of the ring 185 and directly outwardly of the bearing 152. The ratchet tooth engagement is shown in detail in Figure 6, from which it will be apparent that the clutch is free to rotate in one direction with respect to the gear 149, but rotation in the opposite direction results in corresponding rotation of the gear member. The operation of this clutch will be described in detail hereinafter.

The portion 189 of the clutch member 190 is provided on its inner surface with helical splines 193 which are adapted to engage the helical splines 194 of the shaft 137.

A similar overrunning clutch arrangement is provided for clutching the gear 163 to the shaft 89. Thus we provide the gear 163 with axially extending ratchet teeth 195 which are engaged by the teeth 196 of a clutch member 197, which clutch member is mounted in splined relation as indicated at 198 on the shaft 89. The gear 163 carries a ring 199 bolted or otherwise suitably secured thereto, having the inwardly extending boss portions 200 carrying suitable ball members 202 for engaging the tapered surface 203 of the flanged portion of the clutch member 197. Thus the gear 163 can be directly clutched to the shaft 89 through the overrunning clutch mechanism described.

These overrunning clutches operate in a corresponding manner and a description of the operation of one clutch is therefore believed sufficient. The spring-pressed balls 188 have frictional engagement with the external surface of the hub portion of clutch member 190. When gear 149 is rotating at a faster rate than shaft 137, these balls act as fingers tending to drag the clutch member along in conjoint rotation therewith. This results in threading of clutch member 190 along splines 194 to move the member 190 axially of shaft 137 to clutch the shaft with the gear 149. As long as gear 149 is in driving engagement the clutch will remain engaged, this engagement being assisted slightly by the tapered surface 189 of the hub of the clutch member, whereby a slight lateral component of the spring pressure of the balls 188 is exerted toward clutching engagement.

When the drive ratio is shifted so that shaft 137 begins to rotate faster than gear 149, the ball members 188 again act as frictional fingers, tending to slow down the rotation of clutch member 190. Due to the slanting rear faces of the ratchet teeth, member 190 is initially moved outwardly to some extent, and the frictional drag results in further outward axial movement along splines 194, resulting in complete disengagement of the member 190 from the gear 149. The operation of clutch member 197 is similar.

Referring now in detail to the member 126, as shown in Figure 3, the flange 127 is secured to the housing 128 by means of a plurality of circumferentially spaced bolts 129. The flange is provided with a cylindrical extending portion 205 which is provided at oppositely spaced portions with a plurality of axially extending openings 206 and 207. These openings are drilled from the extending end face of the cylindrical flange 205 to a point adjacent the radial flange 127. Suitable parallel laterally extending passageways 208 and 209 are provided leading to the outer surface of the shoulder portion 210 of the member 126.

These openings extend into the enlarged passageways 212 and 213, shown in Figure 3, which project in opposite directions laterally to the outer portion of the housing 128, and there communicate with forwardly extending rectangularly shaped passageways 214 and 215 leading to suitable cylindrical outlet openings or ports disposed laterally on opposite sides of the housing 128. Connected to the cylindrical ports defining the ends of the passageways 214 and 215 are supply conduits 216 and 217, respectively, which are bolted or otherwise suitably secured to the housing 128 as indicated at 218.

It will therefore be apparent that liquid passing through the conduit 216 will pass through the passageway 214 and the passageway 212 into the ports 208, and thence will pass axially of the member 126 along the passageways 206, being discharged axially outwardly of the passageways 206 at the end of the cylindrical portion 205 thereof. Similarly, liquid passing through the conduit 217 and the passageways 215 and 213 will enter the passageways 207 through the ports 209, and will pass axially therethrough to the outwardly extending openings 219 formed intermediate the ends thereof. The opposite ends of the passageway 207 are closed by closure plugs 220 which are retained in position by the split clamping ring 222 engaging in suitable slots formed in the lateral surface of the plugs 220. While the liquid must be under a slight pressure to insure its passage through these passageways, the operation of the transmission unit is in nowise to be considered as a pressure operated system, since its operation is entirely controlled by centrifugal force, as will be described hereinafter.

Referring now in detail to Figure 2, which shows diagrammatically the control mechanism employed for securing simultaneous shifting of any number of power units at the same time, we provide a housing 275 which is adapted to contain the hydraulic clutch element and which may be formed integral with the housing 128 containing the change speed gearing. The housings 128 and 275, at their bottom surfaces, are provided with flanged openings 276 to which may be bolted the flanges 277 of coupling member 278 connected through the pipe 279 to a reservoir 280, the pipe 279 having a similar coupling 282 at its opposite end bolted to an inlet opening in the reservoir 280. Oil from the gear housings 128 and 275 is thereby drained through the opening 276 and the pipe 279 into the reservoir 280, and the reservoir is provided with a plurality of oil pumps indicated diagrammatically at 283, 303, 304 and 305.

The pump 283 is actuated by a suitable electric motor 285, which is connected by the conductor 286 to one power line 292, and by a conductor 288 to a contact segment 289 adapted to be engaged by the controller switch member 290 which is connected to the opposite conductor 287 of a power line. The conductors 287 and 292 may be connected to any suitable source of electric current.

The pump 283 preferably comprises a plurality of individual oil pumps of the gear type, three of which are indicated at 291, 292 and 293. Each of the pumps 291, 292 and 293 supplies oil to a corresponding nozzle 294, 295 and 296 through conduits 297, 298 and 299, respectively. These nozzles are directed at the points of meshing engagement between the respective gears in the gear housing 128, and the discharge of the nozzles may be varied to supply the proper amount of lubricating medium to each point of meshing engagement. Since all of the gears are constantly in mesh and rotate during operation of the system, it is essential that they be properly lubricated. For this purpose, instead of having the gears run in oil, we provide for spraying oil or other similar lubricating medium upon the points of meshing engagement of the gears. This oil then drains from the gears and is conducted back to the reservoir 280 through the pipe 279, as previously described.

The reservoir 280 is provided also with the three pump units 303, 304 and 305, which pump units have their outlets connected to the conduits 216, 217 and 306, respectively. The conduits 216 and 217 are adapted to communicate with opposite sides of the housing 128, and transmit oil from the pumps 303 and 304 into the passageways 214 and 215, respectively, for passage through the passageways 206 and 207, respectively.

Each of the pump units 303, 304 and 305 is operated by an electric motor, as indicated at 307, 308 and 309. One terminal of each of the motors is connected through the conductors 310, 312 and 313 to the power conductor 287, while the other terminal of each of the motors is connected through the conductors 314, 315 and 316, respectively, to three corresponding separated contacts 317, 318 and 319, adapted to be selectively engaged by the control switch arm 290.

The conduit 306 is adapted to supply oil through the coupling 320 to a conduit 322 extending through the interior of the housing 275 enclosing the hydraulic clutches, as shown in Figure 1, the conduit 322 being provided with one or more outlet ports 323 directed into the circumferentially spaced openings 324 of the driving element 92 of the first hydraulic clutch.

For first speed operation, oil is forced by the pump 307, when the controller switch 290 has engaged the segment 289 and the contact 317 to actuate the motors 285 and 307, through the conduit 216 into the member 126, from whence this oil passes through the axially extending passageways 206 into the annular chamber indicated at 325 in Figure 1. From this annular chamber, the oil is adapted to pass through the angularly extending ports or passageways 326, spaced circumferentially in the hub portion 120 of the element 105, into the annular passageway 327 disposed between the driving element 93 and the driven element 104 of the intermediate hydraulic clutch. This oil entering the spaces between the ribs of the driving element 93 is forced outwardly past the annular rib 95 by the centrifugal force caused by rotation of the element 93, and is projected outwardly of the ribs of element 93 adjacent the outer peripheral edge thereof. The oil thus discharged from each of the parts formed by these ribs impinges on the adjacent surfaces of the ribs 106 of the driven element 104, and due to the circumferential component of velocity imparted to this oil by the rotation of element 93, produces an effective force on the surfaces of ribs 106 causing a rotative force to be applied to the element 104 adjacent its periphery. This force, multiplied by the moment arm corresponding to the arm radius of the element, produces a corresponding torque tending to rotate the sleeve 115.

The oil discharged by rotation of the driving element 93 may thus be compared to an oil pressure developed by a centrifugal pump and discharged through nozzles against a hydraulic rotor or turbine member, namely, the driven element 104. The oil impinging on the surfaces of vanes 106 is forced inwardly by the pressure of the oil behind it past the annular rib 107 and then across the inner surface of vanes 106 into contact with the ribs of the driving element 93, thus providing for rotary movement of this oil about the annular ring formed by members 95 and 107. At the same time the oil has a translational movement imparted to it in a circumferential direction by the rotation of element 93 circumferentially, whereby the kinetic energy developed due to centrifugal force is imparted to the rotor 104 to produce rotation thereof. The member 104 therefore has a tendency to come up to conjoint rotation with the member 93, although never actually reaching this point due to the torque resistance thereon. Rotation of the member 104 results in corresponding rotation of the tubular sleeve 115, thereby producing rotation of the gear member 145, which drives the freely rotatable gear 149 in a counter-clockwise direction.

Inasmuch as the member 149 is free to rotate on the shaft 137, no rotation of the shaft 137 occurs until the clutch member 190 rides up the helical splines 193 and 194, due to the relative differential rotation between the member 149 and the shaft whereby the clutch is screwed axially of the shaft into engagement to lock the ratchet teeth 191 and 192 together for conjoint rotation. This, in turn, produces rotation of the shaft 137 which drives the gear 166 to produce corresponding rotation of the freely rotatable gear 163.

In a similar manner, due to difference in speed of rotation of shaft 89 and gear 163, the clutch 197 then rides up the helical splines 198 on the shaft 89, until the gear 163 is clutched to the shaft 89, as previously described. This produces rotation of the shaft 89 to rotate the gear 159 which, in turn, rotates the gear 168 to cause rotation of the bevel driving gear 172. The rotation of the bevel gear 172 results in rotation of either a vertically extending drive transmitting shaft leading to a drive truck under the vehicle, or of a suitably connected propeller shaft or the like, and thereby produces a driving torque for moving the vehicle. Thus first speed operation of the transmission is produced.

When it is desired to shift from first to second speeds, the operator or engineer merely moves the lever 290 from engagement with the contact 317 into engagement with the contact 318. This results in energizing the motor 308 to drive the pump 304, thereby producing flow of oil through conduit 217 into the port 215 of the housing 128. Oil then flows through the passageways 207 in the member 127, and is directed outwardly through the ports 219 into the annular space 328 between the members 94 and 105 of the right-hand hydraulic clutch member, as shown in Figure 1.

This oil is thrown outwardly by centrifugal force in the manner previously described and gradually fills the annular spaces about the ring provided by the semi-circular elements 95–107, causing a driving force to be transmitted to the member 105, whereby the member 105 rotates the tubular sleeve 122, causing rotation of the gear 133. This results in driving engagement of this gear with the gear 136, causing positive rotation of the shaft 137 to which the gear 136 is splined. Rotation of this shaft is at a faster rate than the shaft was rotating during the driving engagement produced by the clutch 190 due to rotation of gears 145 and 149, inasmuch as the gear ratio between the gears 133 and 136 is smaller than the ratio between the gears 145 and 149. This relative difference of rotation results in faster travel of balls 188 with respect to clutch element 190, producing declutching of the clutch element 190 from the gear 149, whereby the gear 149 idles about the shaft 137, and since no more oil from the pump is being forced into the intermediate hydraulic clutching elements, the sleeve 115 merely idles about the shaft 89. The shaft 137, directly driven under the influence of the driving engagement between the gear 136 and the gear 133, rotates the gear 166 to produce rotation of the bevel gear 172 in the same manner, but at a higher speed.

During this operation, oil from the intermediate hydraulic clutch member is being discharged through the peripheral ports 329 disposed outwardly of the vanes 93 and 106, this oil being displaced outwardly by reason of the centrifugal action produced by rotation of the casing 85. The area of the openings 329 with respect to the volume of oil supplied is such as to allow building up of oil during the time that oil is supplied to the clutching element to allow the clutching of the driving and driven elements together, but discharges all of the oil by centrifugal force from the hydraulic clutch when the motor for supplying the oil to this clutch is deenergized. Thus the space within the vanes 93 and 106 is gradually emptied of oil by the centrifugal discharge of the oil outwardly of the casing through the ports 329. The relative rate of discharge of oil from ports 329 with respect to the rate at which oil is supplied for coupling engagement allows filling of the clutch in a predetermined relatively short period of time.

In order to prevent flooding of the selected clutch and possible leakage into an adjacent unenergized hydraulic clutch due to too much oil being supplied to the first clutch, suitable overflow means is provided in the radially extending flange 98 comprising a plurality of enlarged boss portions 330 formed therein and provided with radially extending passageways 332 opening outwardly of the casing 85, the passageways 332 being provided with ports 333 whereby as the level of oil fills up in the hydraulic clutch member until it reaches the ports 333, no displacement of oil except through ports 329 will take place, but as the oil level reaches the ports 333, oil will be displaced outwardly through the passageways 332 to the external portion of the casing 85 at a rate sufficient to prevent flooding of the clutch.

In a similar manner, metered displacement of oil from the hydraulic clutch elements 94 and 105 is provided through the passageways 334, as shown in Figure 1, and suitable overflow means is provided in the depending wall portion 100 of the member 99 by means of the ports 335 and the radially extending passageways 336 formed therein.

Thus is will be apparent that the shift from first to second driving speeds of the selective change speed transmission can be accomplished simultaneously at all of the power units by the use of the hydraulic coupling element, the control being effected by movement of the switch handle 290 by the operator, whereby the energizing pumps for the lower speed are deenergized to provide for relatively slow declutching of the first speed hydraulic clutch members by continued discharge of the remaining portion of oil through ports 329, and the pump units for the second or intermediate speed are simultaneously energized to provide for clutching of the second clutch elements. Inasmuch as the torque load imposed upon the transmission is a direct function of the rate at which the elements will clutch, due to the fact that this torque is responsive for the resistance to the kinetic energy of the centrifugally discharged oil between the relatively stationary driven element and the rotating driving element as the oil is initially impinged against the rotor, it will be apparent that if one of the power units is taking more than its proportionate load of the car, it will not be clutched until such time as all of the units are taking their proportional load. This simultaneous self-compensating feature insures that each of the power units will take its proportionate part of the load during shifting of the speed of the mechanism.

In order to shift from second to third speeds, the operator shifts the control lever 290 into contact with the contact 319, thereby deenergizing the motor 308 and energizing the motor 309 for supplying oil to the nozzles 323. This results in building up of kinetic energy in the oil passed into the hydraulic clutch comprising the driving element 92 and the driven element 106, thereby producing direct rotation of the shaft by means of the engagement of the hub portion 108 of the element 106 with the shaft 89. This therefore produces a direct drive from the power unit to the shaft 89, resulting in rotation of gears 159 and 168 to rotate the bevel driving gear 172. The overflow means for the high speed hydraulic clutch comprises a plurality of bosses similar to the bosses 330, but spaced therebetween and having corresponding ports opening into the annular space 338 disposed between the member 106 and the flange 98. Metered discharge outlets 339 are provided for discharging a certain portion of oil from the hydraulic clutch during direct drive, as previously explained.

When the shaft 89 is directly driven by means of the driven element 106 coupled to the driving element 92, the relative rate of rotation of the shaft 89 is greater than the rate of rotation of the gear 163. Due to the frictional engagement of balls 202, the clutch member 197 is thereby backed away from clutching engagement with the teeth 195 and produces idling movement of the gear 163 about the bearings 160 and 162 of the shaft 89. This results in idling of the gear 166 keyed to the shaft 137, and therefore results in only idling movement of the sleeves 115 and 122.

Without the provision of this overrunning type of clutch, such as shown at 190 and 197, the gears would drive the first and second speed elements at a high rate of speed during direct drive, since the gears are constantly maintained in mesh. It is therefore necessary to provide for some declutching means to prevent this operation of the intermediate speed gears during high speed operation of the car.

It is obvious that any number of such driving units may be simultaneously under the control of the operator, and the switch handle 290 can be used for controlling any desired number of driving units, since the conductors 310, 312, 313, 314, 315 and 316 may be provided with as many branch connections as desired, as shown in Figure 2, going to various other control motors for the operation of the other clutch elements of similar power units. Similarly, branch conductors as shown at 340 are led from the conductors 286 and 288 to other constantly operating motors 285 connected to other of the power units, since it is essential that the motor 285 be energized at all times that any one of the speed control motors is energized, in order to provide for sufficient oil in the reservoir 280. Thus the segment 289 is so formed as to have contact engagement with the member 290 at all times that the member 290 is in engagement with any one of the contacts 317, 318, or 319. Similar branch conductors 342 are connected to the conductors for the respective terminals of motors 307, 308 and 309.

By the provision of the hydraulic clutching element which may be selectively controlled to provide for various speed ratios to the transmission, it is obvious that the operator can shift from first to third speed, or from second to first to third speeds, or may shift his speeds in any desired sequence or manner, depending upon the conditions met in the propulsion of the vehicle, inasmuch as there is no necessity for going through a predetermined sequence of shifting operations, such as is common in the usual type of change speed transmissions.

We have provided for the direct incorporation of a bearing and gear oiling system for the hydraulic transmission and gear casing. Inasmuch as the gears do not run in oil, it is necessary to provide some means for lubricating the various bearings in the assembly to prevent unnecessary wear and noise.

Thus we provide a suitable portion 341 in the cover plate 143 of the housing 128 which is provided with an inwardly extending portion 342 piloted within an enlarged recessed opening 343 of the shaft 147. Oil is introduced through the port 341 from an oil pump unit 344 driven by the motor 285 and supplied through the conduit 346 into the recess 343 and this oil travels axially of the shaft through the passageway 347 extending therethrough. Between the bearings 150 and 152 we provide for a series of radially extending passageways 348 whereby a portion of this oil is transmitted outwardly to the external surface of the shaft by centrifugal force, and is passed through suitable ports in the bearing separator member 349 to effect lubrication of the bearings 150 and 152. This also provides for distribution of lubricating oil over the splines 198.

Adjacent the opposite end of the passageway 347 there is provided another series of radially extending ports 350 providing for lubrication of the bearing 138 through the diagonal passageways 352 in the gear member 136. The pilot bearings 139 at the outer end of the shaft 137 are lubricated by the passage of oil outwardly of the shaft along the walls of the recess 343 into the annular space between the cover plate 143 and these bearings.

In a similar manner we provide a port 353 in the cover plate 156 of the housing 128 having communication with the recessed end 354 of the shaft 89. The shaft 89 is provided with a substantially axially extending passageway 355 communicating with the recessed opening 354, this passageway receiving oil introduced into the port 353. The passageway 355 is provided with a first series of radially extending ports 356 which communicate with suitable openings 357 in the hub portion of the gear 159 for effecting lubrication of the bearings 160 and 162. A second series of radially extending passageways 358 are provided adjacent the splined portion 198 of the shaft for effecting lubrication of the ball bearings 147.

Additional series of radially extending passageways 359 and 360 are provided for lubricating the bearings 144 and 132, respectively, through suitable aligned openings in the sleeves 115 and 122.

At its remote end the passageway 355 is provided with an eccentrically extending passageway 362 communicating therewith, and extending inwardly to the piloted end 112 of the shaft 89. The passageway 362 provides for transmission of oil from the passageway 355 to the pilot bearings 111.

Lubrication of the bearings 117, 123, and 88 is effected by the oil employed for energization of the various clutch units so that, by reason of the present system, all of the bearings of both the hydraulic clutch assembly and the gear assembly are assured proper lubrication for reducing the noise of operation and prolonging the life of the bearings.

In order to effect lubrication of the bearings 173 for the beveled gear shaft 170, we provide a suitable inlet port 364 formed in the cover plate 180 of the adaptor housing 175, which port communicates with an internal axially extending passageway 365 formed in the projecting cylindrical column 366 extending centrally of the beveled gear shaft. The passageway 365 has suitable radially extending ports 367 adjacent the outer end thereof which communicate through the shaft 170 and the bearing retaining nut 178 with the bearings 173 and supply lubrication oil thereto. A second series of radial passageways 368 are provided for supplying oil through the hub portion of the gear 168 to the bearings 174, the gear 168 having diagonal passageways therein directed toward the bearings 174.

The port 353 communicating with the passageway 355 of the main shaft 89 is supplied with oil from the unit 375 of the oil pump 283 through the conduit 376 communicating therewith. The oil for the port 364 is supplied by the unit 377 of the gear pump 283 through the conduit 378. Inasmuch as the motor 285 is constantly energized whenever the rail car is in operation, it is apparent that lubricant will be forced to the nozzles 294, 295 and 296 and to the lubricating ports 341, 343, and 364 during all speeds of operation of the transmission, the pump 283 being a multiple gear type pump having a plurality of gears which may be arranged in a single gear train to have their outlet ports connected to the respective conduits, while all of the inlet portions thereof may be connected to the reservoir 280. The sleeves 115 and 122 are lubricated by leakage of oil along the surface of shaft 89 and from the adjacent bearings and clutch elements.

It is obvious that the details of construction of various of the arrangements and modifications shown herein may be varied to a considerable extent, without, however, departing from the underlying principles forming the basis of the present invention. We therefore do not intend to be limited to the particular structure which we have shown and described, except insofar as defined by the scope and spirit of the appended claims.

We claim:

1. In combination, a clutch housing, a plurality of coaxially spaced hydraulic couplings therein, a sleeve member mounted coaxially thereof at one end of said housing, said sleeve member having longitudinal passages therein, ports for certain of said passages opening into one of said couplings, ports for other of said passages opening into another of said couplings, separate lateral inlet openings for each set of ports, and means for selectively admitting fluid under pressure to said inlet openings.

2. In combination, a clutch housing, a plurality of coaxially spaced hydraulic couplings therein, a sleeve member mounted in one end of said housing coaxially within the adjacent coupling, two sets of axially extending passageways in said sleeve member, one set having radial outlet ports communicating with the interior of said adjacent coupling, the other set having axial outlet ports communicating with the interior of a second coupling, separate inlets for each set of passageways, fluid pump means individual to each inlet, and electrical means selectively operable to actuate either pump means.

3. In combination, a plurality of axially spaced hydraulic couplings, a fluid reservoir common to all said couplings, a corresponding plurality of fluid pumps in said reservoir, means operable for selectively actuating said pumps, conduits from each pump to the corresponding coupling, discharge means in each clutch periphery metered to discharge fluid therefrom at a rate less than the corresponding pump delivers fluid thereto, and overflow means formed between adjacent couplings for limiting the quantity of fluid therein during operation.

4. In combination, a plurality of axially spaced hydraulic couplings, a fluid reservoir common to all said couplings, a corresponding plurality of fluid pumps in said reservoir, means operable for selectively actuating said pumps, conduits from each pump to the corresponding coupling, discharge means in each coupling periphery metered to discharge fluid therefrom at a rate less than the corresponding pump delivers fluid thereto, and overflow means formed between adjacent couplings for limiting the quantity of fluid therein during operation, said overflow means having communication with said respective couplings at points spaced radially from the axis of rotation thereof.

5. A multiple hydraulic coupling unit comprising a rotatable coupling impeller housing, a shaft extending therethrough about which said housing is rotatable, a plurality of coupling rotors in said housing, one of said rotors being keyed to said shaft, coaxial sleeves on said shaft having the other rotors successively keyed thereto, a bushing between the outer sleeve and the bearing support for one end of said housing, separate conduits extending through said bushing to communicate with the interior of certain of said rotors, a separate conduit communicating with the interior of the shaft rotor, a fluid reservoir common to all couplings in said unit, means for selectively forcing fluid under pressure through any one of said conduits, and discharge means in said housing for emptying each of said couplings continuously at a rate less than that at which fluid is supplied through any one of said couplings.

6. In combination, a plurality of axially spaced hydraulic couplings having a common driving casing, a bushing extending into one end of said casing and having two sets of longitudinally extending passageways, lateral inlet openings on opposite sides of said bushing each communicating with one set of passageways, means for selectively forcing fluid under pressure through said inlet openings, and means forming communicating ports between each set of passageways and one of said couplings.

7. In combination, in a multiple hydraulic transmission unit, a shaft, a plurality of sleeves rotatable about said shaft, rotors keyed to each sleeve and to said shaft, a common driving casing enclosing all said rotors and rotatable independently thereof, fluid discharge means formed in the periphery of said casing adjacent each of said rotors, and means in said casing intermediate adjacent rotors for limiting the fluid in any one of said rotor units.

8. Means for coupling a power unit to a driven member comprising a plurality of hydraulic coupling means comprising driving elements constantly driven by said power unit and driven elements adapted to be selectively coupled with said driving elements, a housing, a pair of opposed ports in said housing, a radially flanged cylindrical sleeve member between said housing and said coupling means, lateral passageways from said ports into opposite sides of said sleeve members, passageways extending axially of said sleeve member on opposite sides thereof, the passageways respectively communicating with different ones of said coupling means, and means for supplying fluid selectively to said ports to establish drive between the driving and driven elements of one of said coupling means.

9. A multiple coupling unit including a hydraulic coupling casing having a series of axially spaced driving coupling elements rotatable therewith, a driven shaft journalled in said casing, a plurality of driven coupling elements on said shaft respectively associated with said driving elements to form a series of fluid couplings, only one of said driven elements being keyed to said shaft, an axially directed sleeve forming a journal support for one end of said casing, a plurality of working fluid circuits, each circuit being formed by one of the respective driving and driven coupling elements, and means in said sleeve for selectively receiving and transmitting fluid to the circuits of certain of said couplings.

10. In combination, in a hydraulic coupling unit, a driving casing, a pair of driven rotors axially spaced therein and independently rotatable, said casing having a partition separating said rotors, one of said rotors having a hub journalled radially within said partition and provided with axial passages, a bushing forming a journal for the end of said casing and having its inner end closing said hub passages, means in said bushing forming separate fluid conduit paths, one of said paths having radial ports opening into the interior of said one rotor, the other of said paths having ports opening into said hub, and means for selectively forcing fluid under pressure into each of said conduit paths.

11. The combination of claim 10 wherein said partition has means formed therein limiting the quantity of fluid maintainable in the chamber formed by said one rotor, partition and casing.

12. The combination of claim 10 wherein said hub passages open into the interior of said second rotor on the opposite side of said partition.

13. In combination, a rotatable multiple hydraulic casing, a driven shaft rotatably supporting one end of said casing, a plurality of driven rotors spaced axially in said casing to form axially spaced couplings, one of said rotors being keyed to said shaft the other of said rotors being mounted respectively on coaxial sleeves extending about said shaft, a fluid reservoir, a plurality of separate working fluid circuits, each circuit being formed by one of said couplings, a cylindrical bushing about said sleeves and rotatably supporting the other end of said casing, and means in said bushing for receiving fluid from said reservoir and delivering it into certain of said fluid circuits.

ROBERT J. BURROWS.
ALFRED O. WILLIAMS.
ROBERT LAPSLEY.